(12) United States Patent
Schill et al.

(10) Patent No.: US 6,905,249 B2
(45) Date of Patent: Jun. 14, 2005

(54) BEARING LOCKING MECHANISM

(75) Inventors: Joseph G. Schill, Lynchburg, VA (US);
Christopher D. Shuey, Forest, VA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 164 days.

(21) Appl. No.: 10/370,575

(22) Filed: Feb. 24, 2003

(65) Prior Publication Data

US 2004/0165802 A1 Aug. 26, 2004

(51) Int. Cl.[7] ............................................... F16C 43/04
(52) U.S. Cl. ...................................... 384/541; 384/537
(58) Field of Search ................................. 384/537, 540, 384/541, 542, 559, 561, 562, 564, 569, 584, 585, 276, 280, 295

(56) References Cited

U.S. PATENT DOCUMENTS

| 2,136,819 | A | * | 11/1938 | Large | 384/541 |
|---|---|---|---|---|---|
| 2,690,937 | A | * | 10/1954 | Fayette | 384/537 |
| 3,166,363 | A | | 1/1965 | Kay | |
| 3,276,828 | A | | 10/1966 | Mansfield | |
| 3,517,976 | A | | 6/1970 | McAllister | |
| 3,588,208 | A | * | 6/1971 | Kane | 384/541 |
| 4,728,202 | A | | 3/1988 | LaRou | |
| 5,553,826 | A | | 9/1996 | Schultz | |
| 5,611,231 | A | | 3/1997 | Merritt et al. | |
| 6,167,743 | B1 | | 1/2001 | Marritt et al. | |
| 6,178,797 | B1 | | 1/2001 | Marshall et al. | |

FOREIGN PATENT DOCUMENTS

| GB | 2 167 834 A | 6/1986 |
|---|---|---|
| WO | WO 97/37786 A1 | 10/1997 |

OTHER PUBLICATIONS

Seal Master Sleevloc Spherical Roller Bearings Catalog (SMSL–99), p. 1 and Cover.
Seal Master Mounted Ball Bearings Catalog BB–83, pp. 3, 8, 9 and Cover.
Dodge Imperial Mounted Spherical Roller Bearings Catalog pp. 2, 5 and Cover.
Dodge Unisphere Roller Bearings Catalog pp. B4–44 and B4–45.

* cited by examiner

Primary Examiner—Thomas R. Hannon
(74) Attorney, Agent, or Firm—Foley & Lardner LLP (57) ABSTRACT

A bearing arrangement comprises a sleeve having a cylindrical portion and a hemi-cylindrical portion; and a clamp having first and second halves, wherein the first half engages a surface of a shaft disposed through the sleeve, and wherein the second half has a hemi-annular recess for receiving the hemi-cylindrical portion of the sleeve.

23 Claims, 14 Drawing Sheets

BEARING LOCKING MECHANISM

BACKGROUND OF THE INVENTION

1. Field of the Invention

The present invention relates to a bearing arrangement and more specifically to a locking mechanism for securing a shaft in a bearing.

2. Description of the Prior Art

Conventional techniques for locking flanged, pillow-block, cartridge, and the like type of bearings to a shaft include, but are not limited to dual setscrew attachments (typically 2 screws at 65 degrees); tapered sleeves; and centering collars.

In the case of roller element type bearings such as spherical bearings, special care must be taken to ensure the internal clearances of the bearing are not compromised (diminished to such a degree the bearing will not process effectively at load and speed). Presently, the two most common methods of securing this type of bearing to a shaft are the dual setscrews and tapered sleeves.

Figures 1A, 1B:
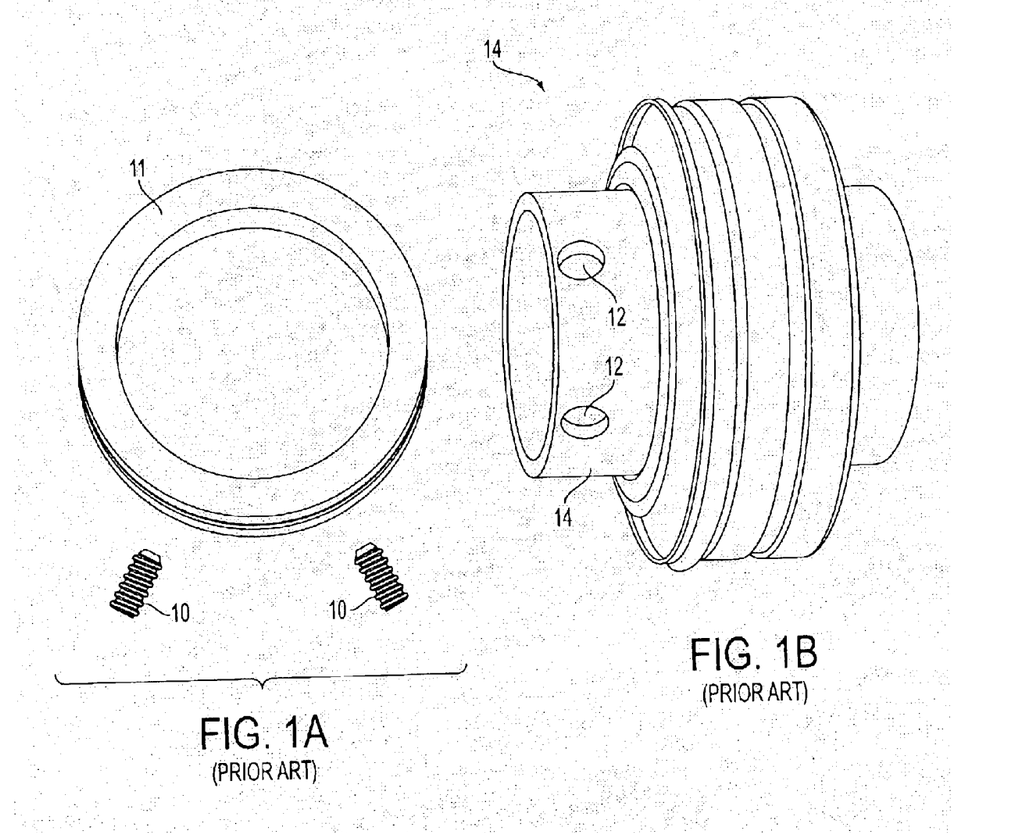
FIGS. 1A and 1B are views of a bearing and a setscrew type clamp arrangement in a disassembled state.
Figure 2:
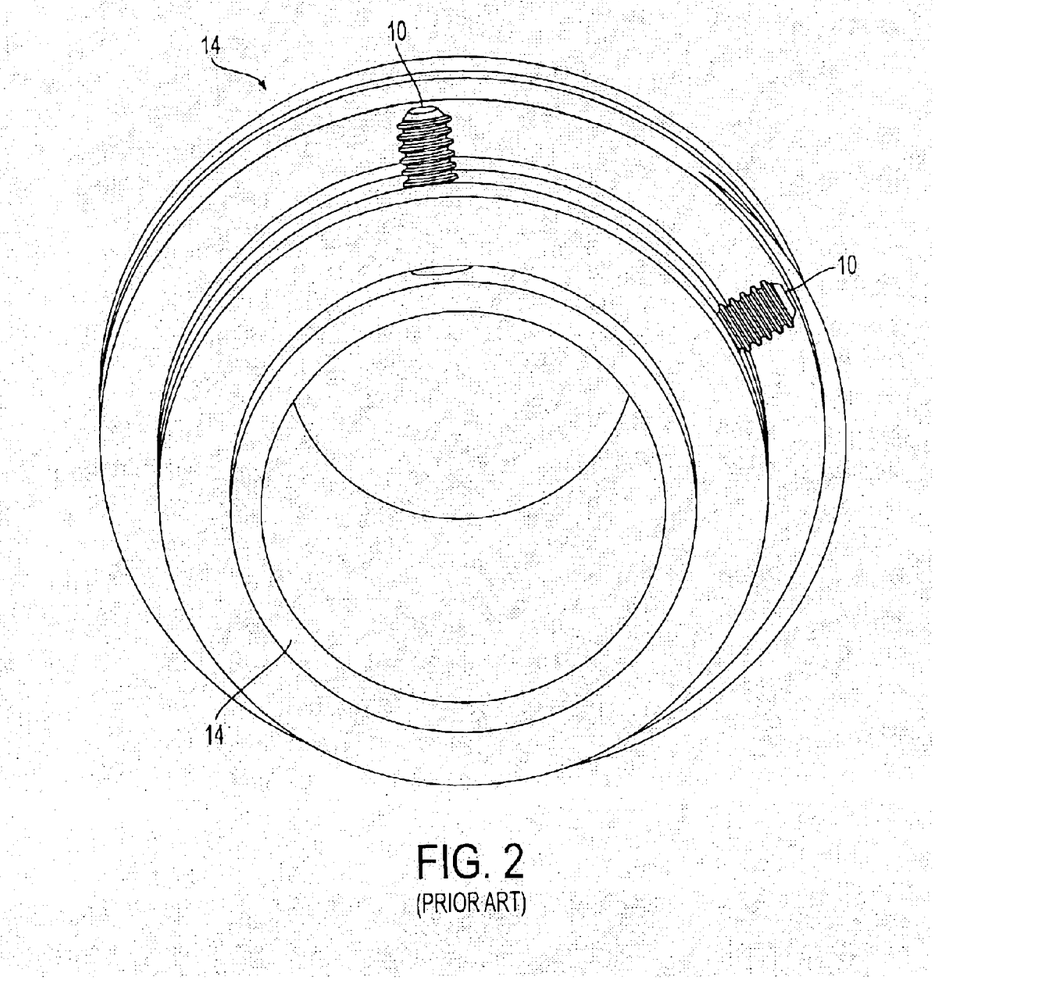
FIG. 2 is a perspective view of the bearing arrangement depicted in FIGS. 1A and 1B, in an assembled state.

The dual setscrew type clamping arrangement is the simplest method of securing a spherical bearing to a shaft. An example of this type of arrangement is shown in FIGS. 1A, 1B and 2. This arrangement has two setscrews 10 threaded into a locking collar 11. The setscrews 10 extend through clearance holes 12 formed in the bearing internal sleeve 14, and bear on the shaft surface.

This mechanism does not impact the internal clearance of the bearing 14, but suffers from a number of drawbacks. Flats must be provided on the shafts and the two screws 10 must always be carefully torqued to specified levels to ensure that the appropriate gripping action is developed. Further, the screws must be replaced with new ones each time the collar is released because the tip of each setscrew is deformed by its initial use and will not produce the desired engagement if reused. In the event that the correct types of setscrews are not used, i.e., cup tipped setscrews, during the replacement, then the necessary relative rotation preventing grip will not be produced. If these requirements are not met, the locking action of the collar may be lost. This loss, of course, leads to slippage and undesirable detrimental effects.

Another drawback of this type of locking mechanism is the shaft becomes eccentric to the bearing by virtue of pulling the clearance between the sleeve and the shaft in one direction. Furthermore, the integrity of the connection depends on the setscrews maintaining their preload under various process conditions including vibrations, cyclic loading, etc.

Another technique of securing a spherical bearing is through a pair of tapered sleeves. With this arrangement, the inside diameter of the inner sleeve, typically split axially, is secured to the OD (outer diameter) of the shaft, while the OD of the outer sleeve is simultaneously secured to the ID (inner diameter) of the bearing race. By forcing the inner and outer sleeves toward one another along the shaft, the inner race of the bearing is expanded. This induces the drawback that the internal clearance between the rollers and the race elements tend to be diminished. Inasmuch as these type bearings have specific dimensional tolerances it is imperative to ensure that the degree of tightening is carefully controlled so that it provides the required connection but does not induce distortion that inhibits proper functioning of the bearing.

Figure 3:
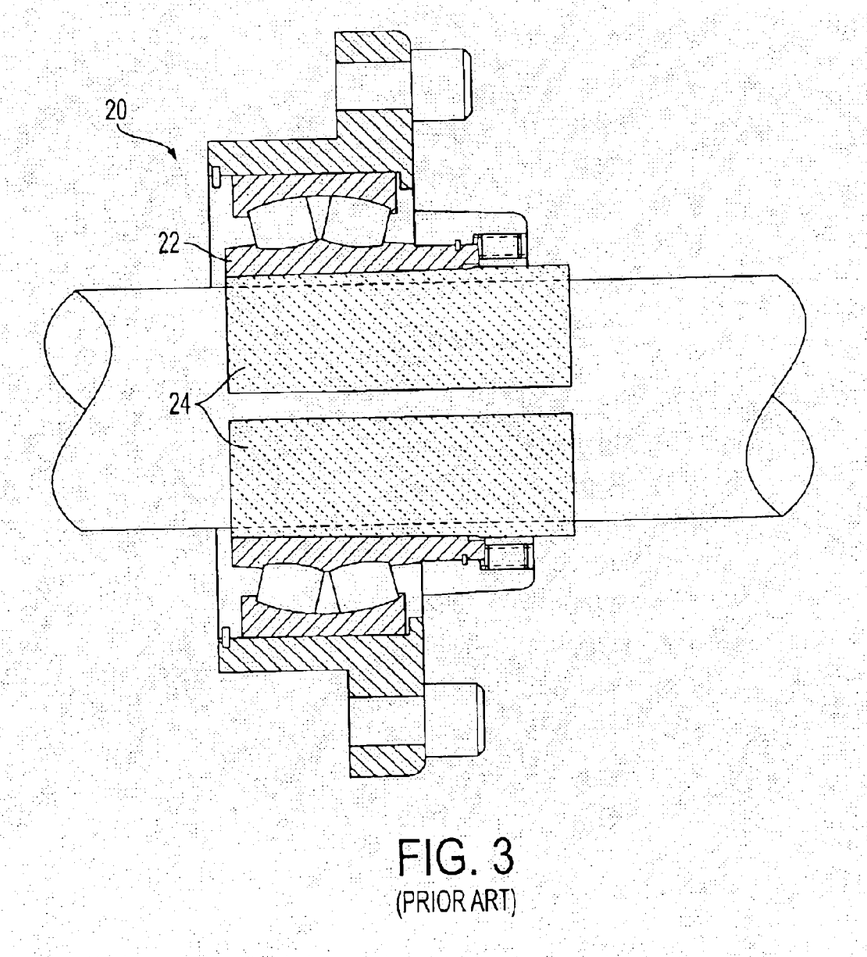
FIG. 3 is a sectional view of a spherical bearing which is provided with a tapered sleeve/race arrangement.
Figure 4:
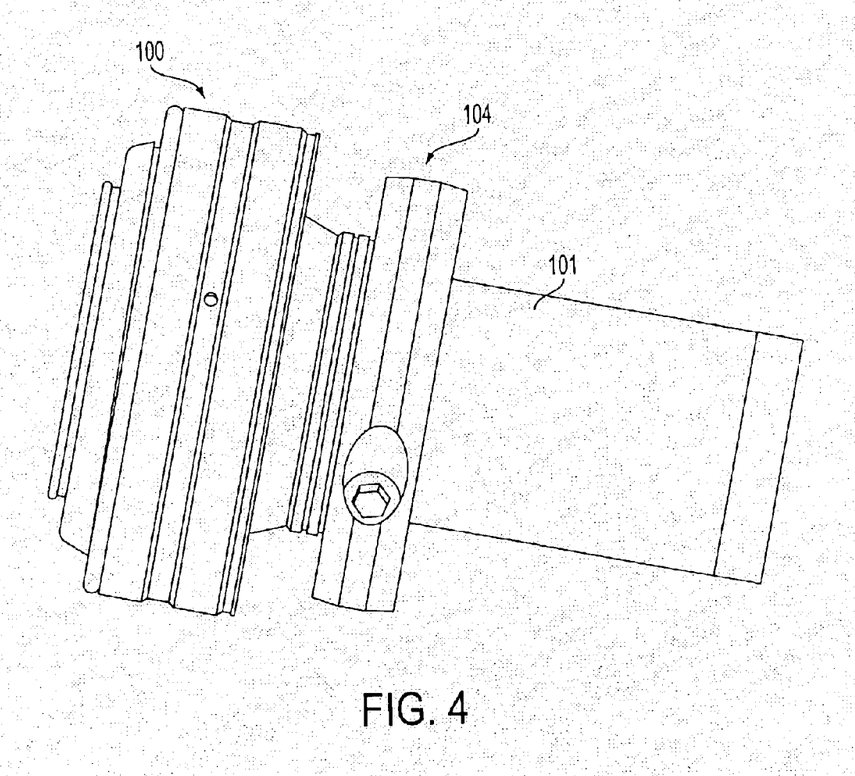
FIG. 4 is a perspective view of a bearing, shaft and clamp arrangement according to an embodiment of the invention.

FIG. 3 shows a variant of this tapered sleeve technique. This arrangement differs in that the inner race 22 of the bearing 20 is tapered and is arranged to cooperate with the split tapered sleeve which is inserted thereinto.

The centering collar arrangement (not illustrated), while being less common than the above mentioned dual setscrew and tapered sleeve arrangements, is a known arrangement for attachment of radial bearings. This arrangement centers the bearing onto the shaft, and provides a positive method of clamping. Unfortunately, this arrangement is not recommended for spherical bearings due to possible distortion of the inner race and its effects on the internal clearances, and for lack of grip due to cantilevered flexed fingers and their inherent lack of surface area contact with the shaft.

SUMMARY OF THE INVENTION

A first aspect of the invention resides in a bearing arrangement comprising: a sleeve having a cylindrical portion and a hemi-cylindrical portion; and a clamp having first and second halves, wherein the first half engages a surface of a shaft disposed through the sleeve, and wherein the second half has a hemi-annular recess for receiving the hemi-cylindrical portion of the sleeve.

A second aspect of the invention resides in a bearing arrangement comprising: an inner race; an outer race; rolling elements interposed between the inner race and outer race; a sleeve integral with the inner race for rotation therewith, the sleeve having a hemi-cylindrical projection axially extending from one end thereof; and a clamp having a first section having a hemi-annular recess for receiving the hemi-cylindrical projection and a second section having an essentially hemi-cylindrical surface adapted for engagement with a shaft which is disposed through the sleeve.

A third aspect of the invention resides in sleeve for a roller element bearing, comprising: a hemi-cylindrical projection axially extending from one end of the sleeve, the hemi-cylindrical projection being adapted to cooperate with a clamp which has a first part adapted to engage a peripheral surface portion of a shaft which is disposed through the sleeve, and a second part which is adapted to engage a peripheral surface of the hemi-cylindrical projection.

A fourth aspect of the invention resides in a clamp for a roller element bearing having a sleeve having a hemi-cylindrical projection at one end, the clamp having a first portion adapted to engage a peripheral surface portion of a shaft which is disposed through the sleeve, and a second portion adapted to engage an outer peripheral surface of the hemi-cylindrical projection.

A fifth aspect of the invention resides in a method of forming a bearing comprising: forming an essentially cylindrical sleeve; cutting an end portion of the sleeve to remove a hemi-cylindrical portion and to leave a hemi-cylindrical portion extending axially from a remaining cylindrical portion.

A sixth aspect of the invention resides in a method of connecting a roller element bearing to a shaft comprising: forming a hemi-cylindrical projection on the end of a cylindrical sleeve which is integral with a inner roller of the bearing; and clamping the hemi-cylindrical to the shaft using a clamp having first and second halves wherein the first half has a first curved surface adapted to seat on a peripheral portion of the shaft and a second half having a second curved surface adapted to seat on an external surface of the hemi-cylindrical portion, and wherein drawing the first and second halves together so that the first surface is forced against the peripheral portion of the shaft and the second surface is forced against the external surface of the hemi-cylindrical clamps the shaft to the sleeve.

With the selected embodiments of the invention a finished envelope size no greater than that of the conventional setscrew bearing design, is enabled. In one embodiment, no special tools are necessary to secure the bearing to the shaft—an ordinary torque wrench can be utilized. The assembly cannot be over-tightened causing damage to the bearing or its normal rated function. In the case of an expansion bearing embodiment, maintainers can easily make adjustments. No flats or other special surface preparation commonly required to secure the setscrews, is required in this embodiment.

BRIEF DESCRIPTION OF THE DRAWINGS

The various features and advantages of the present invention will become more clearly appreciated as a detailed description of the preferred embodiments is given with reference to the appended drawings in which.

DETAILED DESCRIPTION OF THE PREFERRED EMBODIMENTS

FIGS. 4–14 show an embodiment of the present invention. In this arrangement a bearing 100, which, in this instance, takes the form of a spherical bearing, is clamped to a shaft 101 via a sleeve and clamp arrangement generally denoted by the numeral 104. The bearing 100, of course includes inner and outer races and roller elements typically enclosed in a housing having a mounting flange, one variant thereof being shown as item 105 in FIGS. 13 & 14.

In order to render the bearing/clamp arrangement compact, it is preferred to seat the clamp 104 flush against the bearing collar.

Figure 6A:
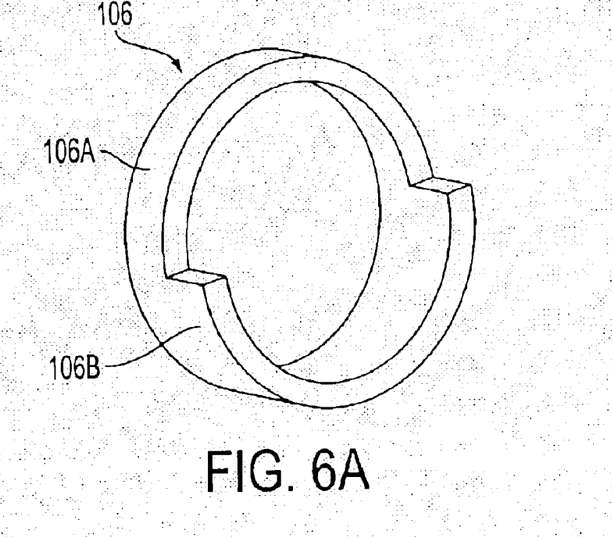
FIGS. 6A and 6b are respectively schematic perspective views showing sleeve variants used in the embodiment of the invention.

As best seen in FIG. 6A the sleeve 106 is formed so as to have a cylindrical portion 106A and a coaxially extending hemi-cylindrical portion or projection 106B. This sleeve 106 can be either unitarily formed with the inner race of the bearing or connected thereto so as to be integral and therefore synchronously rotatable with the inner race.

Figure 5:
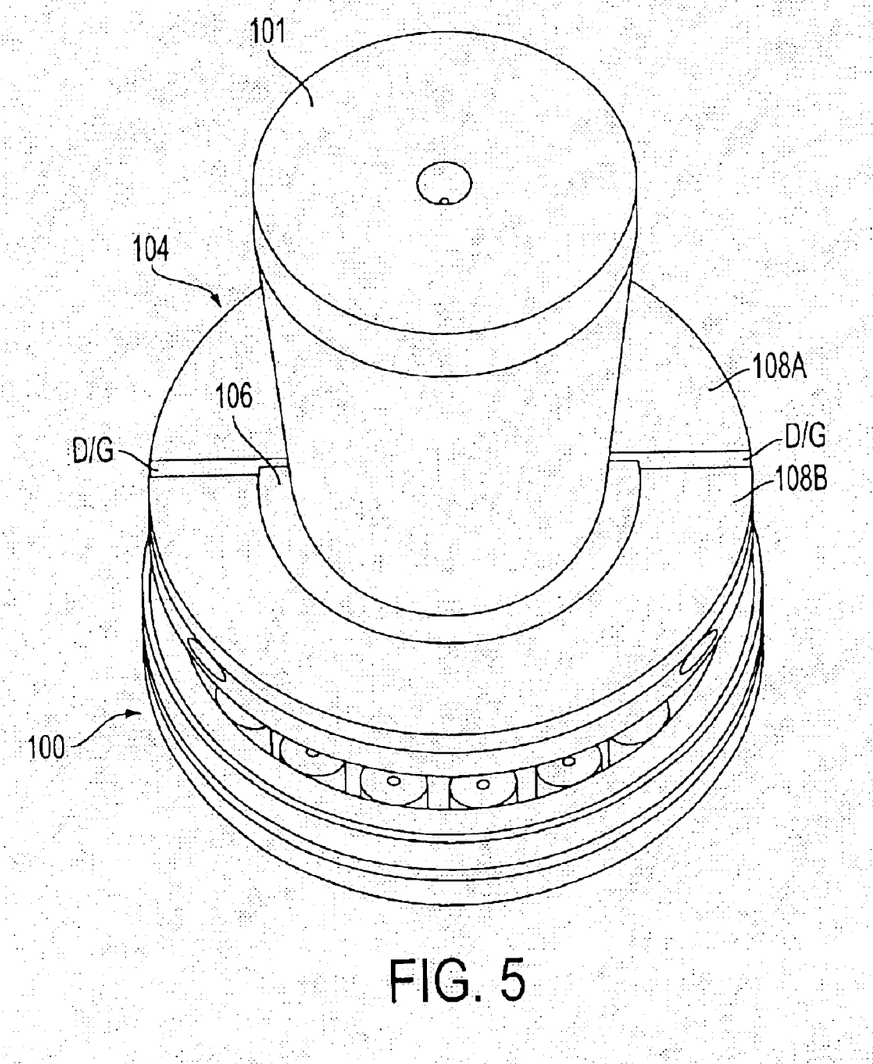
FIG. 5 is a second perspective view of the bearing, shaft and clamp arrangement shown in FIG. 3.
Figure 7A:
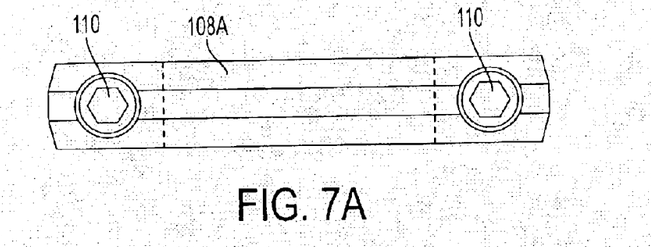
FIGS. 7A–7C are respectively front elevation, plan and side elevation of a clamp used in the embodiments of the present invention.
Figure 7B:
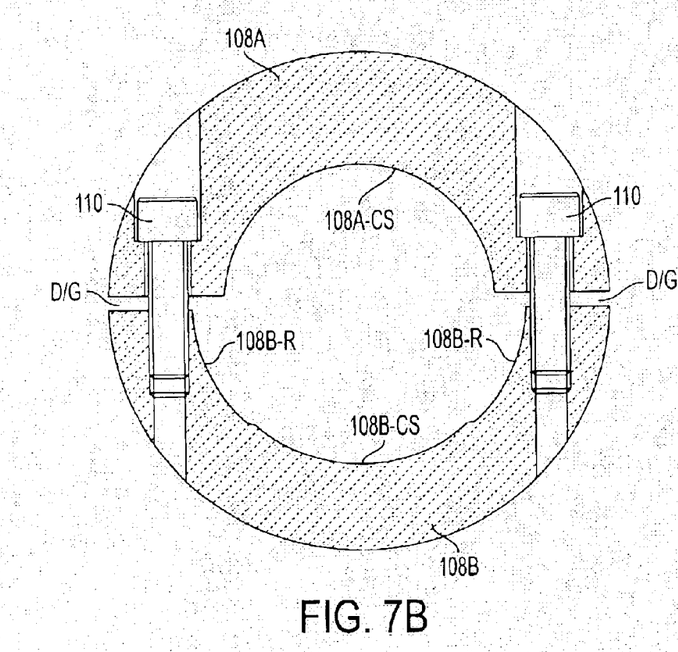
Figure 7C:
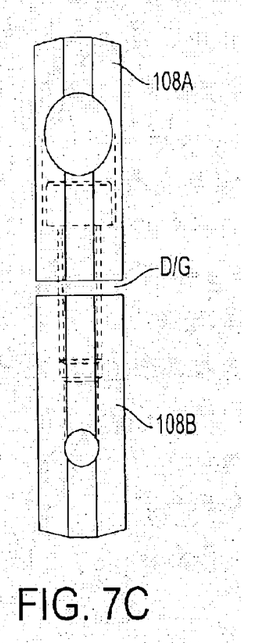
Figure 8:
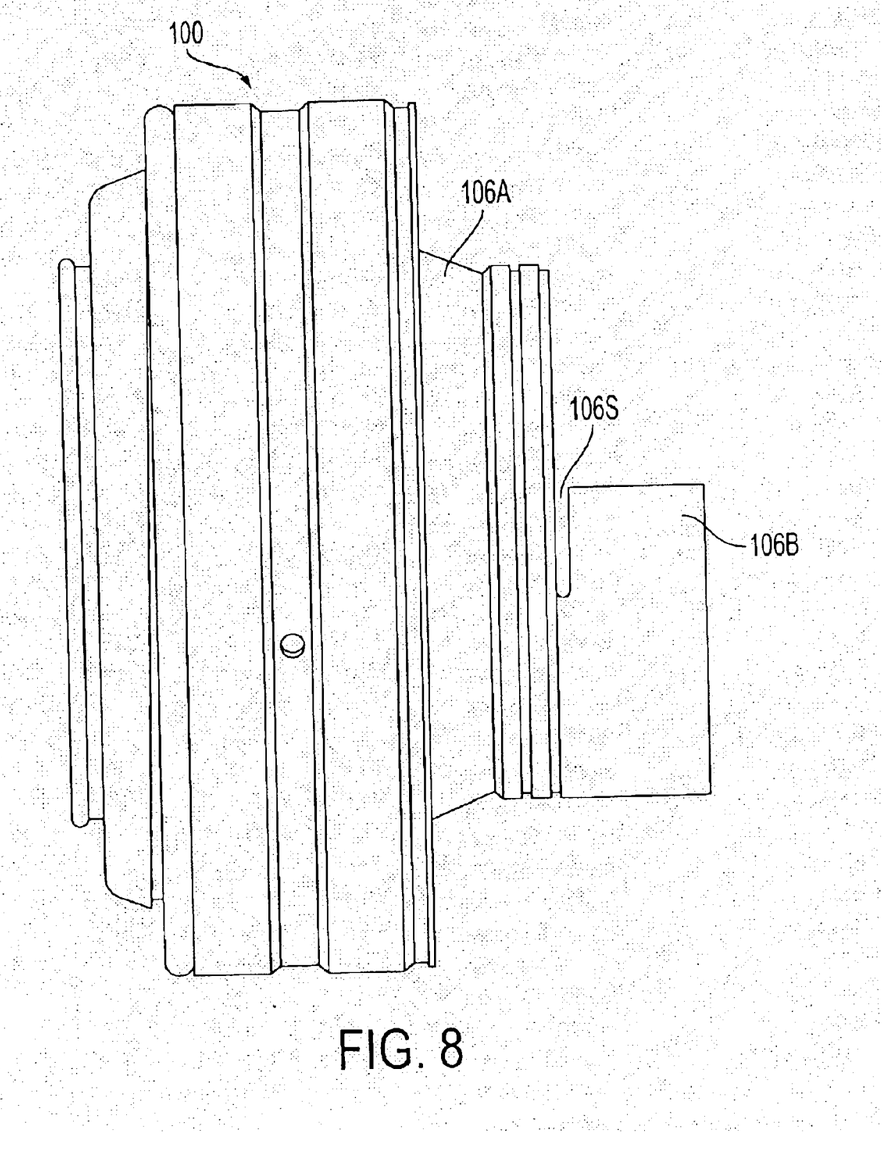
FIG. 8 is a side view of the embodiment of the bearing which is provided with the sleeve arrangement depicted in FIG. 6B.
Figure 9:
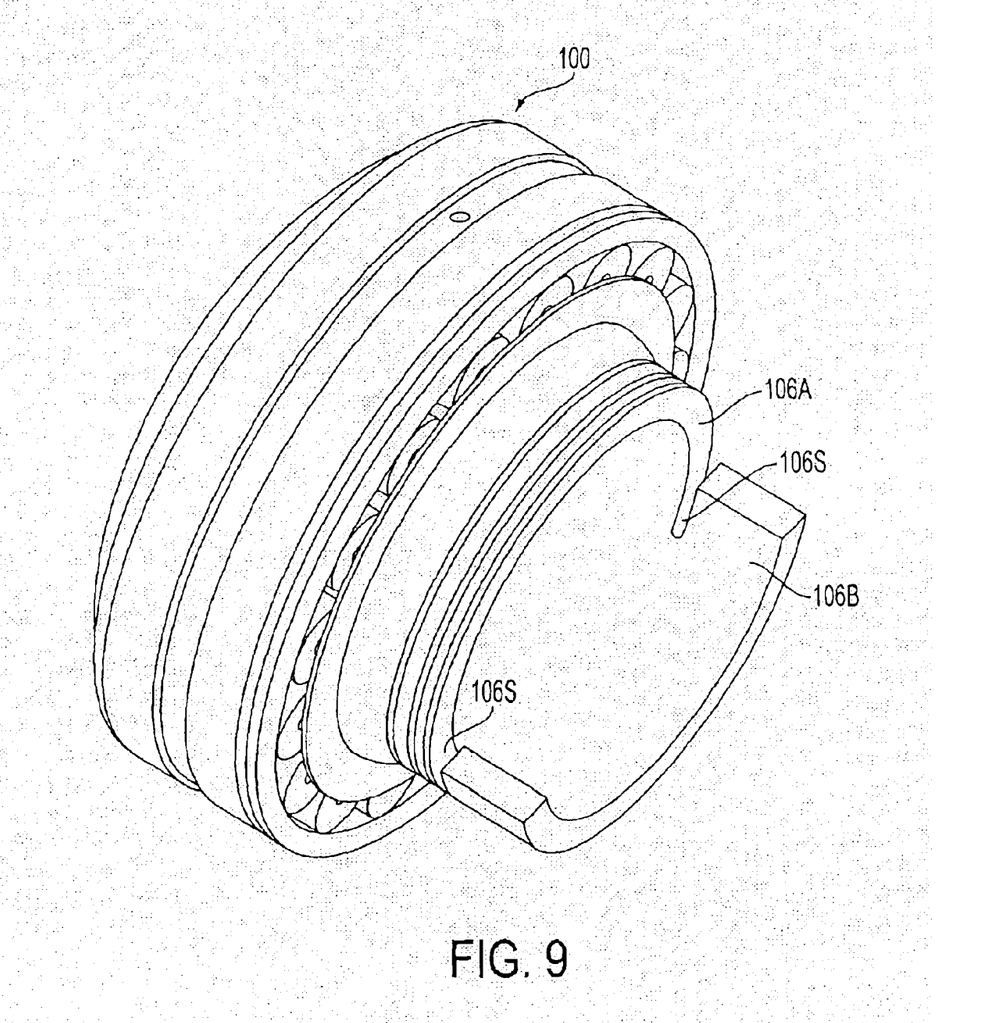
FIG. 9 is a perspective view of the bearing arrangement shown in FIG. 8.
Figure 10:
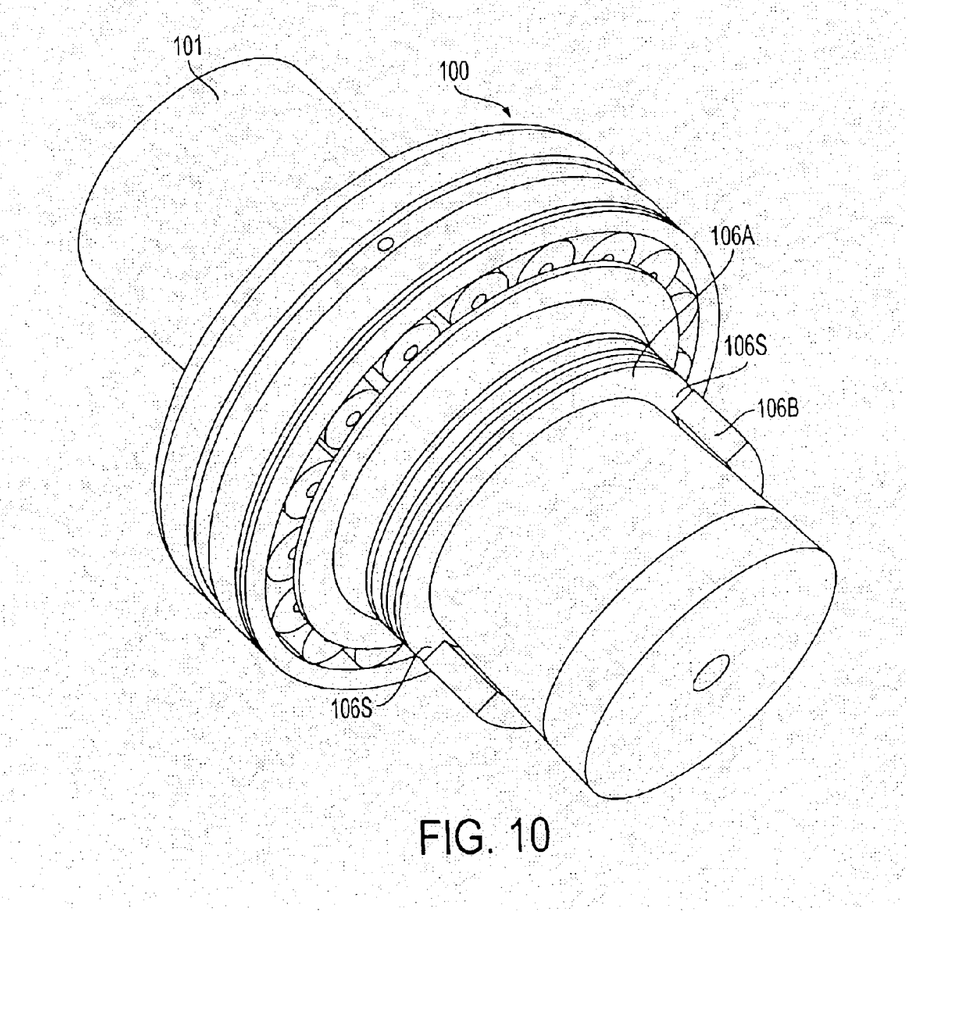
FIG. 10 is a perspective view similar to that shown in FIG. 8 with the shaft disposed in the sleeve of the bearing.
Figure 11A:
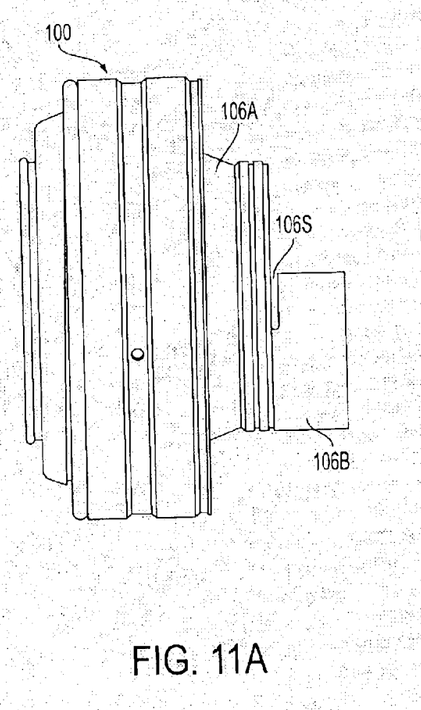
FIGS. 11A and 11B are respectively a side view of the bearing according to the embodiment of the invention and a front view of the clamp in a dissembled state.
Figure 11B:
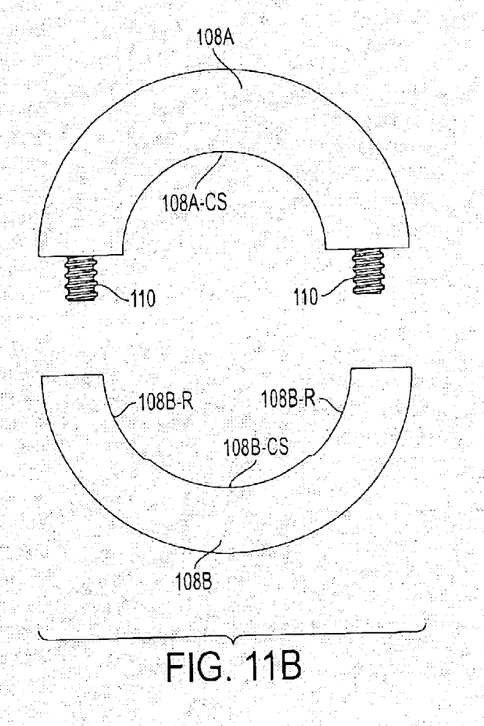

As seen in FIGS. 5 and 7 the clamp 108 comprises of first and second halves which shall be referred to respectively as "upper" and "lower" halves 108A and 108B. The upper half 108A has an inner curved surface 108A-CS having an inner diameter selected to coincide with the outer diameter of the shaft 101 which is to be clamped in the bearing 100. The lower half 108B has a curved inner surface having an inner diameter selected to coincide with the outer diameter of the hemi-cylindrical portion 106. Thus, when the two halves 108A, 108b are assembled, they engage the shaft 101 and the hemi-cylindrical portion 106B in the manner depicted in FIGS. 5 and 7, for example.

By drawing the upper and lower halves 108A, 108B of the clamp together using socket head cap screws 110 or the like, the upper half 108A grips the shaft 101 in a manner which produces a first surface-to-surface contact while the lower half 108B grips the hemi-cylindrical portion 106B in a manner which produces a second surface-to-surface contact. The force applied to the hemi-cylindrical portion 106B forces it into engagement with a portion of the shaft 101 not contacted by the upper half 106A.

As will be noted, the upper and lower halves 108A and 108B of the clamp are dimensioned so that the juxtaposing faces establish design gaps D/G which allow the halves to be tightended down without contact/interference between the two halves that might limit the degree to which they can be drawn together.

Under these conditions, relative rotation between the shaft 101 and the sleeve 106 is securely prevented. Repeated disconnection and re-connection of the shaft and the bearing can be accomplished without the need to use new parts or to exercise excessive care when torquing the two halves together.

Figure 6B:
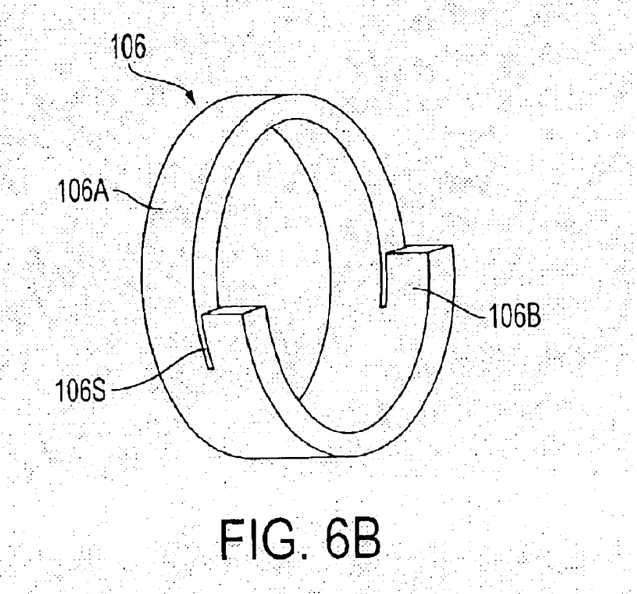

In order to prevent any flexure and/or distortion of the hemi-cylindrical portion 106B from being transmitted through the cylindrical portion 106A of the sleeve 106 and inducing undesirable changes in the clearances defined between the rolling elements and the inner and outer race members of the bearing 100, a variant of the sleeve is, as shown in FIG. 6B, provided with slots 106S which extend perimetrically with respect to the hemi-cylindrical portion 106B, allow for the flexure of the hemi-cylindrical portion 106B with respect to the main cylindrical portion 106A and essentially eliminate any effect of the flexure of the hemi-cylindrical portion 106B against the shaft 101, being transmitted via the cylindrical portion 106A to the inner race of the bearing 100 in a manner which causes any changes in the spatial relationship between the rolling elements and the inner and outer race members from occurring. The slots are formed in the sleeve so as to be located outboard of the lubricant seals of the bearing so as to avoid any compromise of their efficiency.

Figure 12:
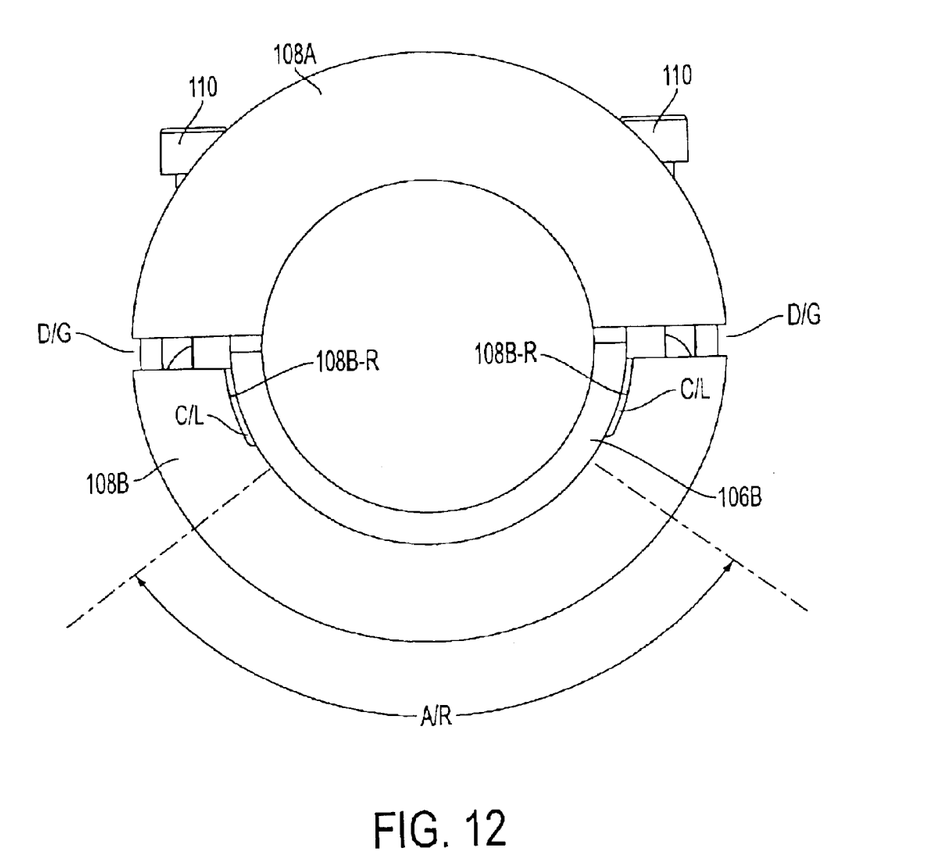
FIG. 12 is a end view of the bearing showing the clamp secured to the shaft and hemi-cylindrical portion of the sleeve.

Another distortion reducing structure which attenuates/prevents distortion of the hemi-cylindrical portion 106B of the sleeve being transmitted back through the cylindrical portion 106A into the bearing proper in a manner which causes clearances in the bearing to deviate from their preferred ranges, takes the form of a pair of recesses 108B-R which are formed at the opposite ends of the curved surface 108B-CS of the lower half 108B. These recesses 108B-R form a pair of clearances C/L which, as best seen in FIG. 12, reduce the arc A/R through which force is applied to the hemi-cylindrical portion 106B of the sleeve. This attenuates transmission of distorting forces from the hemi-spherical portion to the cylindrical portion and the inner race as the clamp is applied and thus achieves an effect similar to that provided with the slots 106S in the sleeve and can be used in lieu of the slots 106S.

Figure 13:
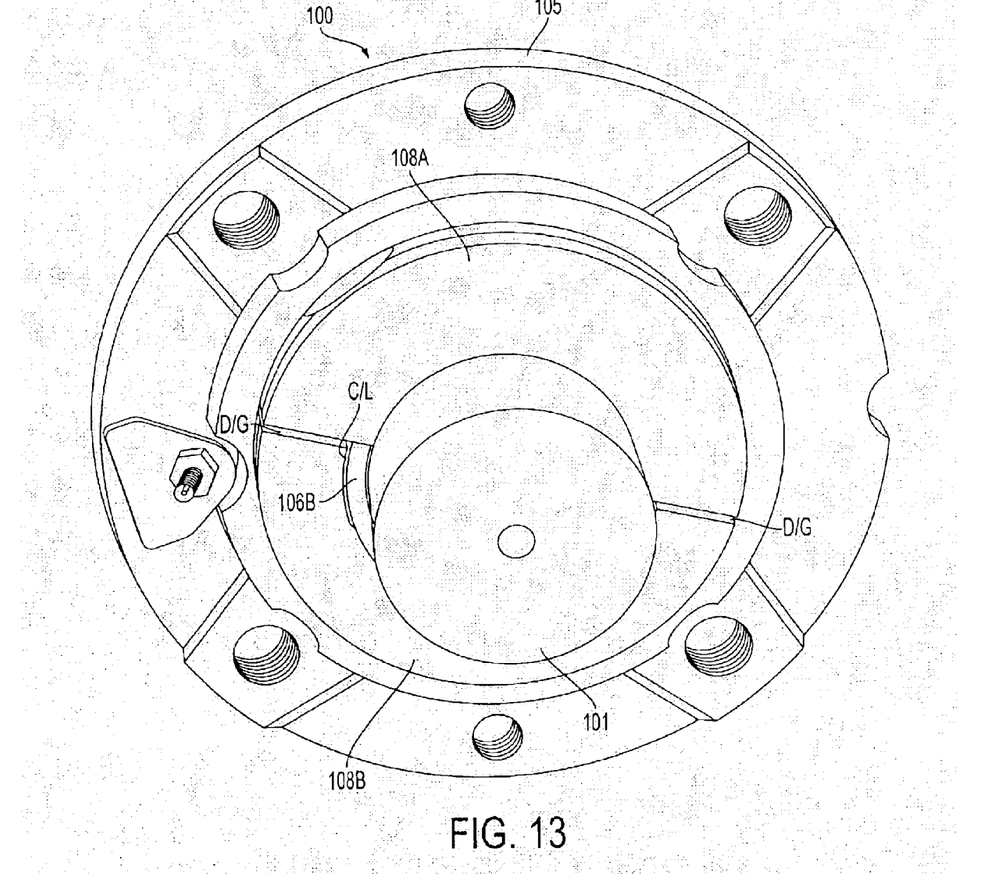
FIGS. 13 and 14 are perspective views of the embodiment of the present invention which show the clamp disposed in position.
Figure 14:
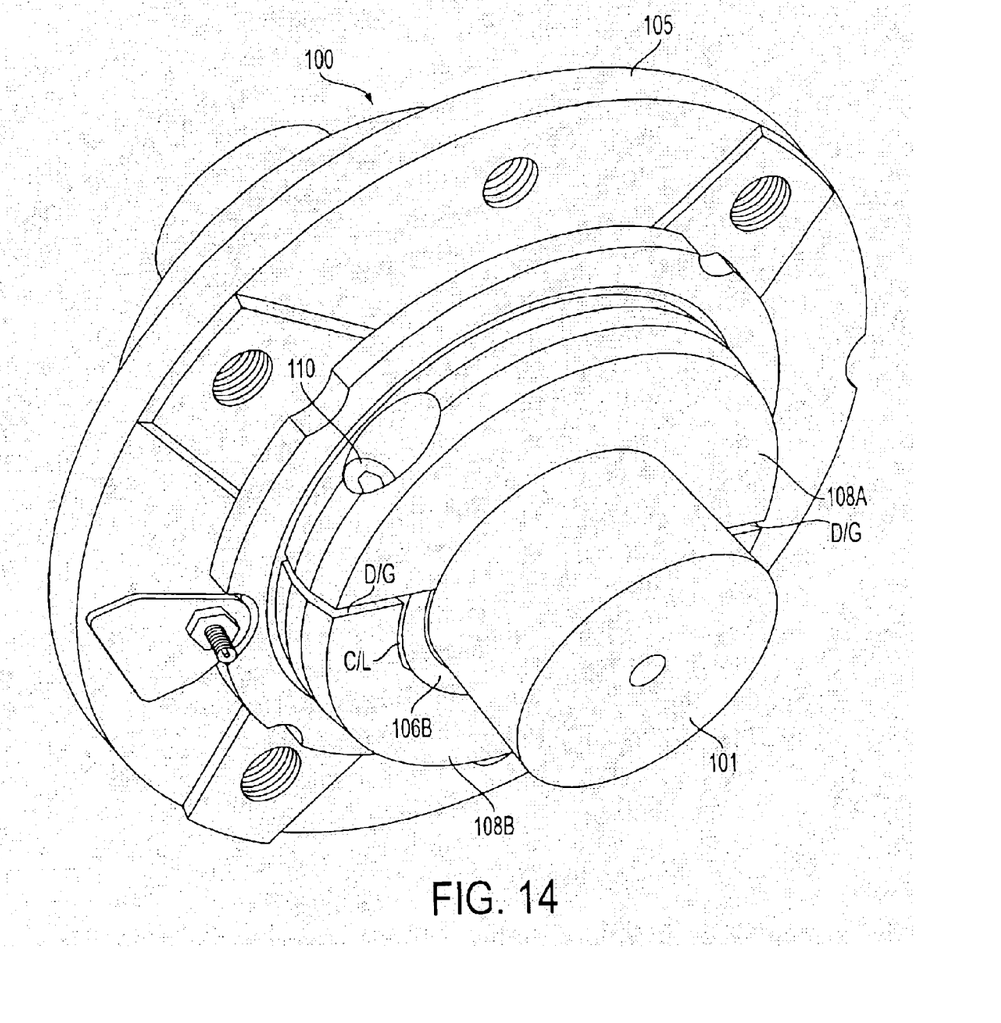

FIGS. 13 and 14 show the bearing 100 enclosed in the housing 105 having a mounting flange via which the bearing can be secured to a frame or chassis of a machine or the like of which the shaft 101 forms an operative element.

When constructing the bearing, the sleeve can be cut and/or machined to have the hemi-cylindrical projection, and/or slots prior to annealing/hardening. This renders the metal softer and easier to machine. A further variant of the sleeve can include forming the second or lower part of the clamp so as to be integral and/or unitary element with the hemi-cylindrical projection. This formation, if so desired, can also be implemented prior annealing/hardening.

Although the invention has been described with reference to only a limited number of embodiments, it will be understood that, given the preceding disclosure and the concepts that can be distilled therefrom, a person skilled in the art to which the present invention pertains or most closely pertains, would be able to readily envisage the variants and changes that are possible without departing from the scope of the appended claims.

For example, while only two arrangements are disclosed for preventing distortion being transmitted back into the bearing proper in a manner which invites a disturbance of the preferred spatial relationship between the rolling elements and the inner and outer races, it is within the scope of the invention to use both in combination and/or provide other structures which provide a similar function. For example, drill holes can be used in place of the slots or a groove or grooves can be formed in locations to permit flexure of the hemi-cylindrical portion of the bearing with respect to the main body thereof so that distortion of the main body is essentially eliminated. Similarly a hinged clamp may be used in place of a 2-piece split clamp.

In addition to the above, it is also possible to provide a pin which is pressed into the lower half 108B of the clamp and to provide a hole in the hemi-cylindrical projection 106B in which the pin can register and thus facilitate the positioning of components during clamp assembly.

What is claimed is:

1. A bearing arrangement comprising:
   a sleeve having a cylindrical portion and a hemi-cylindrical portion; and
   a clamp having first and second halves, wherein the first half engages a surface of a shaft disposed through the sleeve, and wherein the second half has a hemi-annular recess for receiving the hemi-cylindrical portion of the sleeve, and wherein the first and second halves are releasably connected to each other by screws.

2. A bearing arrangement as set forth in claim 1, wherein the bearing is a rolling element bearing having a plurality of rolling elements and inner and an outer race portions which operatively cooperate with the rolling elements.

3. A bearing arrangement as set forth in claim 2, wherein the roller element bearing is a spherical bearing.

4. A bearing arrangement as set forth in claim 1, wherein the hemi-cylindrical portion extends coaxially with respect to the cylindrical portion.

5. A bearing arrangement as set forth in claim 1, wherein the first and second halves of the clamp are each semi-circular in shape and form an essentially circular configuration when connected together by the screws.

6. A bearing arrangement as set forth in claim 1, wherein the first half of the clamp has a first inner surface which establishes surface-to-surface contact with the external peripheral surface of the shaft.

7. A bearing arrangement as set forth in claim 1, wherein the second half of the clamp has a inner surface which establishes surface-to-surface contact with the external peripheral surface of the hemi-cylindrical portion.

8. A bearing arrangement as set forth in claim 2, further comprising a distortion reducing structure associated with one of the clamp and the sleeve, which minimizes a change in inter-dimensional relationships between the rolling elements and the inner and outer race portions when the clamp applies force to the shaft and the hemi-cylindrical portion of the sleeve.

9. A bearing arrangement as set forth in claim 8, wherein the distortion reducing structure comprises a slot formed in the hemi-cylindrical portion adjacent the cylindrical portion and so sized and dimensioned as to enable flexure of the hemi-cylindrical portion with respect to the cylindrical portion and essentially eliminates distortion of the cylindrical portion.

10. A bearing arrangement as set forth in claim 8, wherein the distortion reducing structure comprises a pair of slots wherein each slot is formed in the sleeve between the cylindrical portion and hemi-spherical portion, the pair of slots forming a pair of tongue-like portions that are located opposite one another.

11. A bearing arrangement as set forth in claim 10, wherein each of the slots of the pair of slots is configured to be an essential mirror image of the other.

12. A bearing arrangement as set forth in claim 10, wherein each of the slots of the pair of slots extends perimetrically with respect to the hemi-cylindrical portion.

13. A bearing arrangement as set forth in claim 8, wherein the distortion reducing structure comprises a recess formed in a curved surface of the second half of the clamp which engages a surface of the hemi-cylindrical portion which reduces the amount of contact between the second half and the hemi-cylindrical portion.

14. A bearing arrangement as set forth in claim 8, wherein the distortion reducing structure comprises a pair of recesses formed in opposite ends of a curved surface of the second half of the clamp which engages an outer diametrical surface of the hemi-cylindrical portion of the sleeve and which form clearances between the second half of the clamp and the outer diametrical surface of the hemi-cylindrical portion.

15. A bearing arrangement comprising:
   an inner race;
   an outer race;
   rolling elements interposed between the inner race and outer race;
   a sleeve integral with the inner race for rotation therewith, the sleeve having a hemi-cylindrical projection axially extending from one end thereof; and
   a clamp having a first section having a hemi-annular recess for receiving the hemi-cylindrical projection and a second section having an essentially hemi-cylindrical surface adapted for engagement with a shaft which is disposed through the sleeve, and wherein the first and second sections of the clamp are separate members which are releasably connected to each other by fasteners.

16. A bearing arrangement as set forth in claim 15, wherein the sleeve and the inner race are unitarily formed.

17. A bearing arrangement as set forth in claim 15, wherein a cylindrical portion and the hemi-cylindrical projection are coaxial.

18. A bearing arrangement as set forth in claim 15, wherein the fasteners are screws.

19. A bearing arrangement as set forth in claim 15, further comprising a distortion reducing structure associated with one of the clamp and the sleeve which minimizes change in inter-dimensional relationships between the rolling elements and the inner and outer race portions when the clamp applies force to the shaft and the hemi-cylindrical projection of the sleeve.

20. A bearing arrangement as set forth in claim 15, further comprising a distortion reducing structure which comprises a pair of slots wherein each slot is formed in the sleeve between the hemi-spherical projection and the sleeve to form a pair of tongue-like portions which are located opposite one another.

21. A bearing arrangement comprising:
   an inner race;
   an outer race;
   rolling elements interposed between the inner race and outer race;
   a sleeve integral with the inner race for rotation therewith, the sleeve having a hemi-cylindrical projection axially extending from one end thereof; and
   a clamp having a first section having a hemi-annular recess for receiving the hemi-cylindrical projection and a second section having an essentially hemi-cylindrical surface adapted for engagement with a shaft which is disposed through the sleeve, and
   wherein a distortion reducing structure comprises a pair of recesses formed in opposite ends of the curved surface of the second section of the clamp which engages an outer diametrical surface of the hemi-cylindrical projection of the sleeve and which form clearances between the second section of the clamp and the outer diametrical surface of the hemi-cylindrical projection.

22. A clamp for a roller element bearing having a sleeve having a hemi-cylindrical projection at one end, the clamp having a first portion adapted to engage a peripheral surface portion of a shaft which is disposed through the sleeve, and a second portion adapted to engage an outer peripheral surface of the hemi-cylindrical projection, and wherein the first portion comprises a first half which has a first curved surface adapted to produce a first surface-to-surface contact with the shaft, wherein the second portion comprise a second half which has a second curved surface adapted to produce a second surface-to-surface contact with an outer surface of the hemi-cylindrical projection, and wherein the first and second halves are operatively interconnected by fasteners.

23. A method of securing a roller element bearing to a shaft comprising:
   disposing a sleeve with a cylindrical portion and a hemi-cylindrical projection which is integral with a inner roller of the bearing around a shaft; and
   clamping the hemi-cylindrical projection to the shaft, wherein clamping the hemi-cylindrical projection comprises:
   disposing a clamp having first and second halves wherein the first half has a first curved surface adapted to seat on a peripheral portion of the shaft and wherein the second half has a second curved surface adapted to seat on an external surface of the hemi-cylindrical portion, on the shaft and the hemi-cylindrical projection respectively, and
   drawing the first and second halves together so that the first surface is forced against the peripheral portion of the shaft and the second surface is forced against the external surface of the hemi-cylindrical and clamps the shaft to the sleeve.

\* \* \* \* \*